(12) United States Patent
Lee et al.

(10) Patent No.: US 9,596,018 B2
(45) Date of Patent: Mar. 14, 2017

(54) WIRELESS COMMUNICATION APPARATUS FOR CONTROLLING MULTI-ANTENNA MODULE AND RELATED METHOD THEREOF

(71) Applicant: Realtek Semiconductor Corp., HsinChu (TW)

(72) Inventors: Tsung-Hsuan Lee, Taipei (TW); Chung-Yao Chang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 14/484,289

(22) Filed: Sep. 12, 2014

(65) Prior Publication Data

US 2015/0078488 A1 Mar. 19, 2015

(30) Foreign Application Priority Data

Sep. 14, 2013 (TW) .............................. 102133324 A (51) Int. Cl.
*H04B 7/02* (2006.01)
*H04B 7/08* (2006.01)
*H04B 7/06* (2006.01)

(52) U.S. Cl.
CPC ......... *H04B 7/0874* (2013.01); *H04B 7/0691* (2013.01)

(58) Field of Classification Search
CPC ..... H04L 1/0618; H04L 1/06; H04L 25/0204; H04B 7/0417; H04B 7/0669
(Continued)

(56) References Cited

U.S. PATENT DOCUMENTS

2011/0085459 A1* 4/2011 Kuriki ................. H04B 7/0608
370/252
2011/0105038 A1* 5/2011 Kushida ............... H04B 7/0608
455/63.1

(Continued)

FOREIGN PATENT DOCUMENTS

| CN | 101527589 A | 9/2009 |
| CN | 102104204 A | 6/2011 |
| TW | 201330527 | 7/2013 |

*Primary Examiner* — Zewdu Kassa
(74) *Attorney, Agent, or Firm* — Winston Hsu; Scott Margo (57) ABSTRACT

A wireless communication apparatus for coupling to a multi-antenna module comprising a plurality of antennas, the wireless communication apparatus includes: a switching circuit, arranged for selectively changing the connected relations of the plurality of antennas according to a switching signal, so as to make the multi-antenna module generating a plurality of antenna combinations; and a receiving module, coupled to the switching circuit, including: a signal intensity measurement circuit, arranged for measuring signal intensity of a wireless packet received through the plurality of antenna combinations, so as to generate a plurality of measurement results; and an antenna switching determination circuit, during a training state, arranged for choosing a first comparison group comprising at least two antenna combinations from the plurality of antenna combinations for receiving the wireless packet, and determining a better antenna combination according to measurement results of the first comparing group.

36 Claims, 10 Drawing Sheets

(58) Field of Classification Search
USPC .......................................... 375/267, 260, 259
See application file for complete search history.

(56) References Cited

U.S. PATENT DOCUMENTS

| | | | |
|---|---|---|---|
| 2011/0151810 A1* | 6/2011 | Su .......................... | H01Q 3/242 455/129 |
| 2013/0051438 A1* | 2/2013 | Lee ....................... | H04B 7/0608 375/219 |
| 2013/0273856 A1* | 10/2013 | Park ..................... | H04B 7/0404 455/73 |

* cited by examiner

WIRELESS COMMUNICATION APPARATUS FOR CONTROLLING MULTI-ANTENNA MODULE AND RELATED METHOD THEREOF

BACKGROUND OF THE INVENTION

1. Field of the Invention

The disclosed embodiments of the present invention relate to a wireless communication system, and more particularly, to a wireless communication apparatus which transmits and receives packets by using a plurality of antennas, and a related method thereof.

2. Description of the Prior Art

With the advancement of technology, wireless communication systems are becoming popular. For wireless communication systems, the performance of transmission tends to be affected by ambient variations. For example, performance of a transceiver of a wireless communication system may be degraded (e.g. having reduced signal-to-noise ratio (SNR), increased packet error ratio (PER), low transmission rate, phenomenon of packet retransmission) by serious channel effect, by interference induced by other wireless communication systems or electronic devices, by shielding effect induced by surrounding buildings, or by directions or positions of antennas of the wireless communication system.

Some users are accustomed to moving themselves for finding another position with better recipient to reach wireless communications services provided by the internet service provider (ISP). Some uses may call the ISP to add or adjust base stations. Both solutions are highly inconvenient and may not immediately overcome the aforementioned issues.

SUMMARY OF THE INVENTION

One of the objectives of the present invention is to provide a wireless communication control circuit collaborating with a multi-antenna module, to improve the wireless communication performance.

According to a first embodiment of the present invention, a wireless communication apparatus for coupling to a multi-antenna module comprising a plurality of antennas is disclosed. The wireless communication apparatus comprises: a switching circuit, arranged for selectively changing the connections of the plurality of antennas according to a switching signal, so as to allow the multi-antenna module generating a plurality of antenna combinations; and a receiving module, coupled to the switching circuit, comprising: a signal intensity measurement circuit, arranged for measuring signal intensity of a wireless packet received through the plurality of antenna combinations, so as to generate a plurality of measurement results; and an antenna switching determination circuit, during a training state, arranged for selecting a first comparison group comprising at least two antenna combinations from the plurality of antenna combinations for the receiving module's use to receive the wireless packet, and determining a better antenna combination according to measurement results of the first comparing group; wherein the receiving module enters the training state or a decision state according to a training enable signal.

According to a second embodiment of the present invention, a wireless communication control method for controlling a multi-antenna module with a plurality of antennas to perform wireless packet transmission and reception is disclosed. The multi-antenna module is controlled to provide a plurality of antenna combinations. The control method comprises: measuring signal intensity of a wireless packet received through the plurality of antenna combinations, so as to generate a plurality of measurement results; entering a training state according to a training enable signal; during the training state, selecting a first comparison group comprising at least two antenna combinations from the plurality of antenna combinations to receive a wireless packet, and determining a better antenna combination according to measurement results of the first comparing group; and entering a decision state according to a training enable signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Directions and positions of antennas of a wireless communication system form different antenna patterns, which affect the transmission efficiency of the wireless communication system. Such a difference between antennas is called antenna diversity. The present invention provides a communication control circuit able to perform antenna selection by rearranging an antenna pattern and determining the antenna diversity, which optimizes the communication system.

Figure 1:
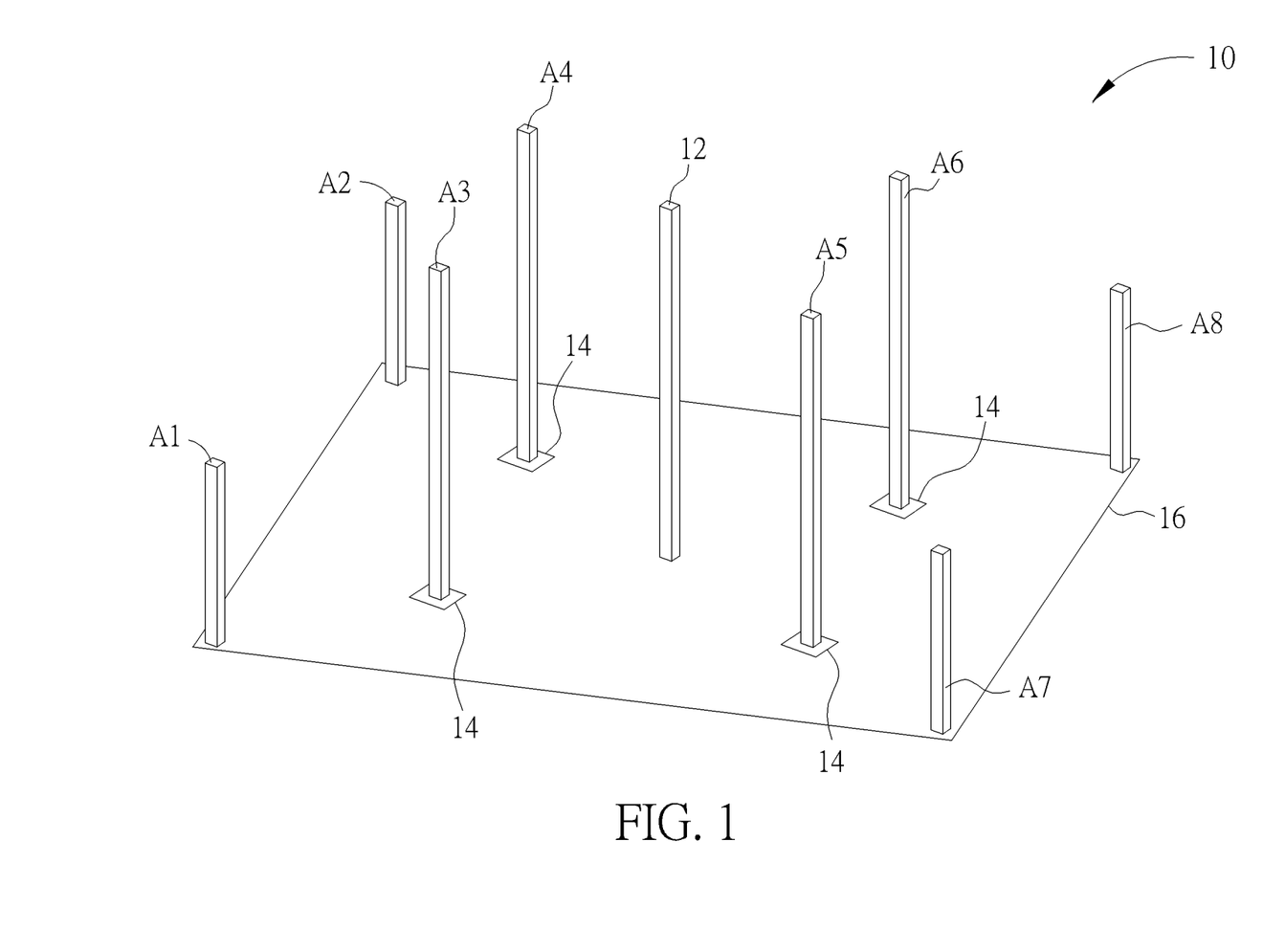
FIG. 1 is a diagram illustrating a multi-antenna module according to an embodiment of the present invention.
Figure 2:
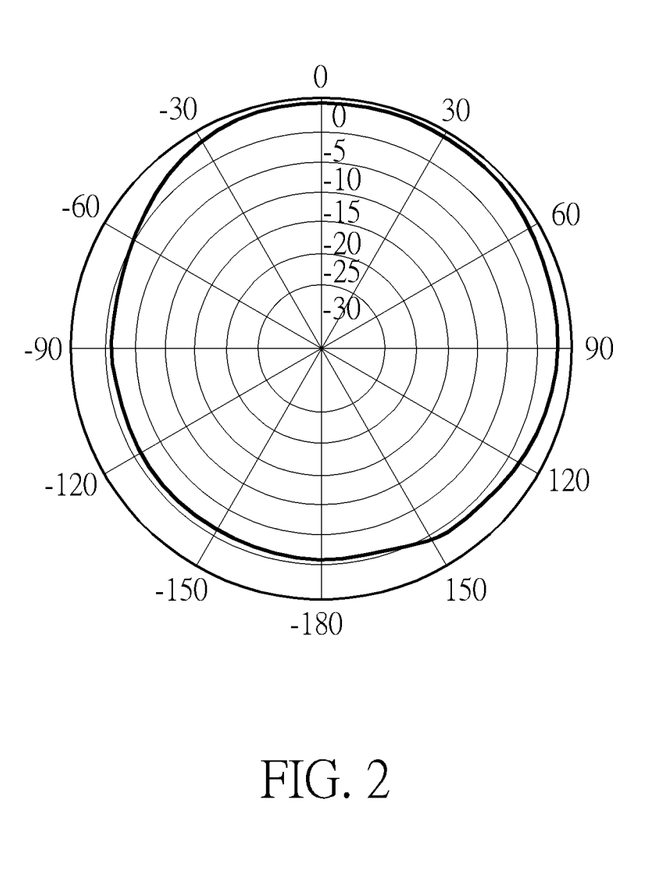
FIG. 2 is a diagram illustrating a directional antenna pattern.
Figure 3:
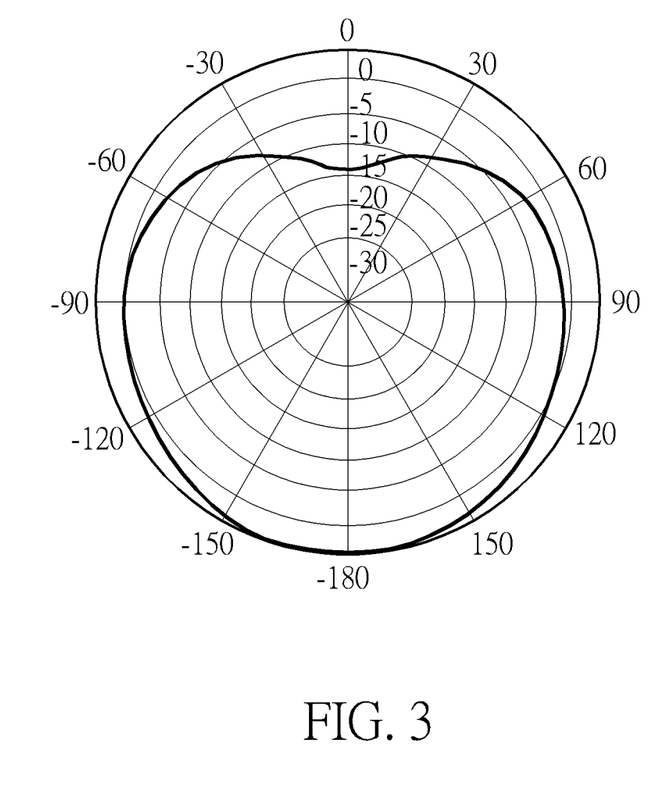
FIG. 3 is a diagram illustrating another directional antenna pattern.

The proposed wireless communication system may work with a multi-antenna module 10 shown in FIG. 1. Antennas A1-A8 and a main antenna 12 are disposed on a printed circuit board (PCB) 16, wherein antenna directivity units 14 are set between the antennas A3-A6 and the PCB 16. The antenna directivity units 14 may be implemented by switches. Through controlling the antenna directivity units 14, a plurality of antenna combinations with different antenna patterns can be formed in the multi-antenna module 10. Different antenna patterns formed by different antenna combinations are depicted in FIG. 2 and FIG. 3, and the details regarding controls of directivity units and associated antenna patterns can be found in Taiwanese Patent Publication No. 201318267. The multi-antenna module 10 shown in FIG. 1 is for illustrative purpose only. Those skilled in the art should readily understand alternative designs (for instance by changing the number or the arrangement of antennas) also belong to the scope of the present invention.

Figure 4:
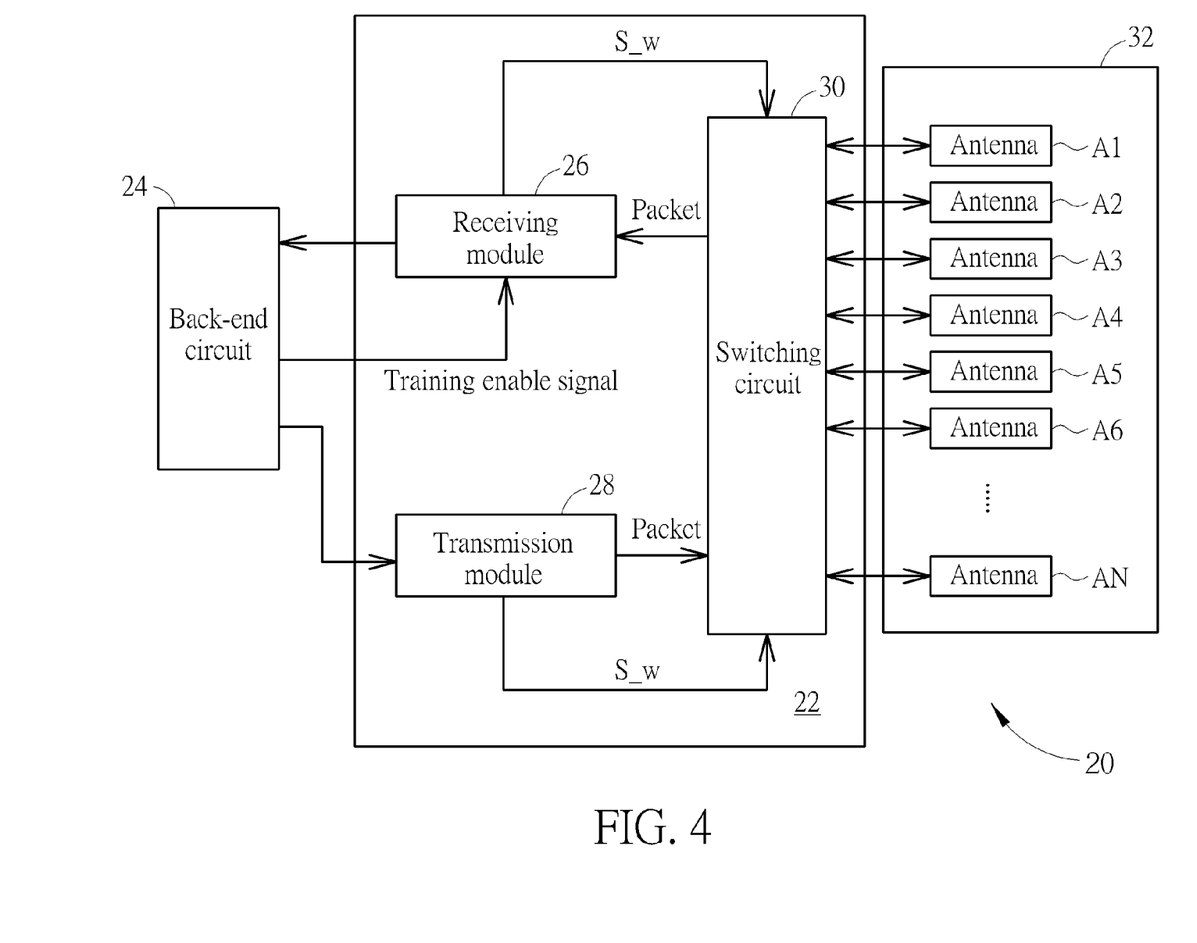
FIG. 4 is a diagram illustrating a wireless communication system according to an embodiment of the present invention.

FIG. 4 is a diagram illustrating a wireless communication system according to an embodiment of the present invention. The wireless communication system 20 includes a multi-antenna module 32, a control circuit 22 and a back-end circuit 24. The control circuit 22 includes a receiving module 26, a transmission module 28 and a switching circuit 30. In this embodiment, the receiving module 26 and the transmission module 28 generate a switching signal S_w to control the switching circuit 30 to rearrange the conduction of the antennas A1-AN, thus allowing the antenna module 32 to provide a plurality of antenna combinations.

The operation of the wireless communication system 20 includes a training state and a decision state. The back-end circuit 24 notifies the system to enter the training state by issuing a training enable signal. During the training state, when the wireless communication system 20 is at a standby mode (RX idle), the receiving module 26 first controls the switching circuit 30 to switch to a first antenna combination. When the receiving module 26 detects a packet, the receiving module 26 records a signal intensity of the first antenna combination used for receiving the packet, and then controls the switching circuit 30 to switch to the second antenna combination by changing the switching signal S_w, and records a signal intensity of the second antenna combination used for receiving the packet. The receiving module 26 compares the signal intensity of the first antenna combination with the signal intensity of the second antenna combination when receiving the packet respectively. If the signal intensity of the first antenna combination is greater than that of the second antenna combination when receiving the packet, it means that the reception capability of the first antenna combination in respect with receiving the packet is better. Hence, the receiving module 26 will switch the antennas back to the first antenna combination through the switching circuit 30 to continue the reception of the packet. On the contrary, if the signal intensity of the second antenna combination is greater than that of the first antenna combination when receiving the packet, it means that the reception capability of the second antenna combination in respect with receiving the packet is better. Hence, the second antenna combination will be used to continue the reception of the packet. After the better antenna combination is obtained and the packet is completely received, the receiving module 26 will record information which indicates the packet is received by using the first antenna combination or the second antenna combination as well as the source address (SA) of the packet, and then the information will be transmitted to the back-end circuit 24. In a preferred embodiment, the receiving module 26 completes the antenna selection process mentioned above before an auto gain control (AGC) process. For example, the antenna selection process is performed while a preamble of a packet is being received, and then a better antenna combination can be used to receive a data part of the packet. In a preferred embodiment, a high speed integrated circuit (IC) is used to implement associated circuits due to a very short time interval between the time when a packet is detected and the time to perform the AGC process.

In this embodiment, the back-end circuit 24 includes software and hardware associated with data integration and packet process performed by a central processing unit (CPU), such as a driver. Before the training state ends, the back-end circuit 24 determines a best antenna combination according to information, including the better antenna combination, the signal intensity, the source address, etc., notified by the receiving module 26. After that, the training enable signal will be dessert to control the wireless communication system 20 to enter the decision state.

At the decision state, the receiving module 26 provides the switching signal S_w to the switching circuit 30 for packet reception and transmission according to the best antenna combination decided by the back-end circuit 24. In another embodiment, if the wireless communication system 20 enters the standby mode at the decision state, the wireless communication system 20 will initially stay in the antenna combination corresponding to an omnidirectional antenna pattern until a packet is detected, and then switch to the best antenna combination once a packet is detected; or the wireless communication system 20 will further compare the reception ability of the best antenna best antenna combination with the reception ability of the omnidirectional antenna combination, and select the one with a better reception ability to continue the packet reception until the time entering the standby mode or the training state again. Since the wireless environment may change anytime, the best antenna combination needs to be updated correspondingly. The wireless communication system of the present invention enters into the training state periodically, or determines whether to enter into the training state by referring to the ambient variation.

Figure 5:
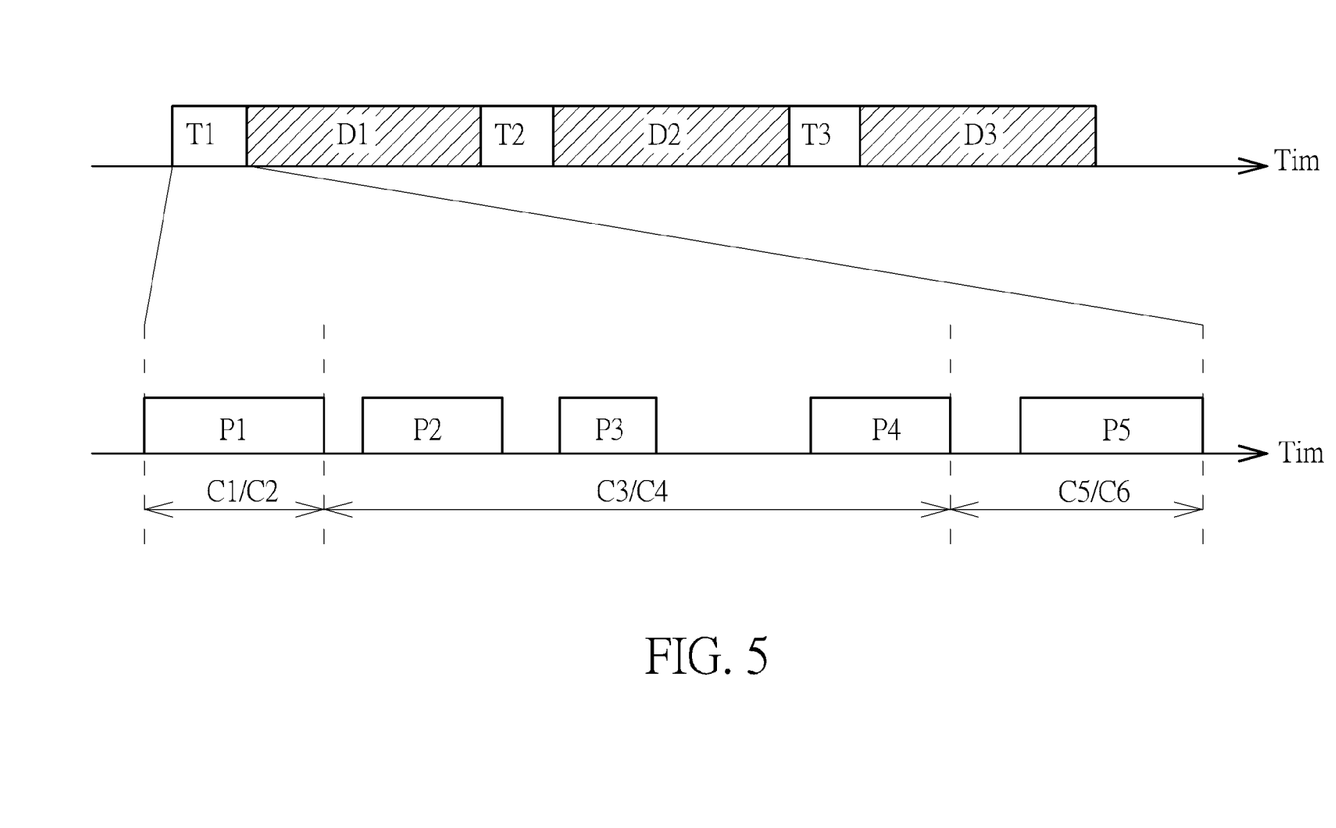
FIG. 5 is a timing diagram illustrating the deployment of the training state and the decision state.

FIG. 5 is a diagram illustrating the timing arrangement of the training state and the decision state as well as detailed operations of the wireless communication system at the training state. In FIG. 5, T1, T2 and T3 indicate the training states, and D1, D2 and D3 indicate the decision states. In this embodiment, there is a set of training addresses stored in a memory of the receiving module 26 according to a default setting. At the time when certain predetermined conditions are met, the back-end circuit 24 can modify the set of training addresses. According to FIG. 5, the training states T1, T2 and T3 all use the same training address. During the training state T1, total 5 packets P1-P5 are received, wherein the source address of each of the packet P1 and the packet P4 are identical with the training address, and C1-C6 represent a first antenna combination to a sixth antenna combination, respectively.

When the training state T1 starts, the wireless communication system 20 is at the standby mode and configured as the first antenna combination C1 for receiving incoming packets. When the packet P1 arrives, the receiving module 26 compares the signal intensity of the packet P1 received by using the first antenna combination C1 with the signal intensity of the packet P1 received by using the second antenna combination C2. A better antenna combination is selected for receiving the rest of the packet P1. Because the source address of the packet P1 and the training address are identical, the first antenna combination C1 and the second antenna combination C2 are regarded as a first comparison group. After the packet P1 is completely received, the receiving module 26 switches the antenna combination at the standby mode to the third antenna combination C3 and the fourth antenna combination C4 for packet reception, which are regarded as a second comparison group. During the standby mode with the use of the third antenna combination C3, the third antenna combination C3 and the fourth antenna combination C4 are used for the reception of incoming packets in succession. Similarly, a better antenna combination can be found according to the signal intensity of each packet. Since the source addresses of the packet P2 and the packet P3 are different from the training address, the antenna combination at the standby mode is still the third antenna combination C3 after the packet reception, until the packet P4 arrives. When the better antenna combination is selected and the packet P4 is completely received, the receiving module 26 determines the source address of the packet P4 is the same as the training address set by the back-end circuit 24, and thus the antenna combination of at the standby mode is switched to the fifth antenna combination C5 which belongs to a third comparison group (including the fifth antenna combination C5 and the sixth antenna combination C6). During the standby mode with the use of the fifth antenna combination C5, the fifth antenna combination C5 and the sixth antenna combination C6 are used for the reception of incoming packets in succession, and a better antenna combination is selected. After the packet P5 is completely received, the training state T1 is over. The back-end circuit 24 has determined a best antenna combination by referring to the information derived according to the reception of the packets P1-P5, and then the system enters the decision state D1. In this embedment, since only packets P1 and P4 are from the training address, the back-end circuit 24 determines the best antenna combination with respect to the training address by only referring to the better antenna combination and the signal intensity measurement result of the packets P1 and P4. When the back-end circuit 24 determines the fourth antenna combination C4 as the best antenna combination, the system uses the fourth antenna combination C4 for the reception of all packets after entering the decision state D1, until the training state T2 is entered. Hence, the best antenna combination is found out again after the system enters the training state T2. During the decision state D1-D3, it is also allowed to wait for packets under the predetermined omnidirectional antenna combination. And once a packet is detected, it is switched to the fourth antenna combination C4, or the one with better reception ability that is selected from the fourth antenna combination C4 and the predetermined omnidirectional antenna combination.

In above embodiments, because the receiving module 26 only reports the signal intensity of the better antenna combination to the back-end circuit 24, the back-end circuit 24 has no chance to know the signal intensity of the antenna combination which has a weaker signal intensity all the time and is never selected for receiving the packet. Thus, the signal intensity of the antenna combination may be assumed to be a minimum value (e.g. 0% or −100 dBm).

Please refer to the wireless communication system 20 shown in FIG. 4. The back-end circuit 24 derives the signal intensity of each antenna combination through the information reported by the receiving module 26, and selects the antenna combination having the strongest signal intensity with respect to the training address as the best antenna combination. When the back-end circuit 24 tries to transmit a packet which has a destination address (DA) identical to the training address, the back-end circuit 24 appends the best antenna combination information to the packet before transmitting the packet to the transmission module 28. After receiving the best antenna combination information, the transmission module 28 can output the switching signal S_w to the switching circuit 30 according to the best antenna combination information, so as to transmit the packet to the destination address through the best antenna combination. When an instant reply, such as a response packet, is required, the antenna combination of the transmission module 28 can be decided by the receiving module 26 since the back-end circuit 24 needs more time to respond and such a response time is not allowable. After the receiving module 26 has received the packet, the better antenna combination determined when receiving the packet will be directly transmitted to the transmission module 28. Hence, the transmission module 28 will be able to generate the corresponding switching signal S_w and transmit the response packet via the better antenna combination.

The wireless communication system 20 maybe a network adaptor or a wireless base station. When the wireless communication system 20 is a network adaptor, the training address may be the media access control (MAC) address of the wireless base station. When the wireless communication system 20 is a wireless base station, the training address maybe the MAC address of one of the network adaptors connected to the wireless base station.

Figure 6:
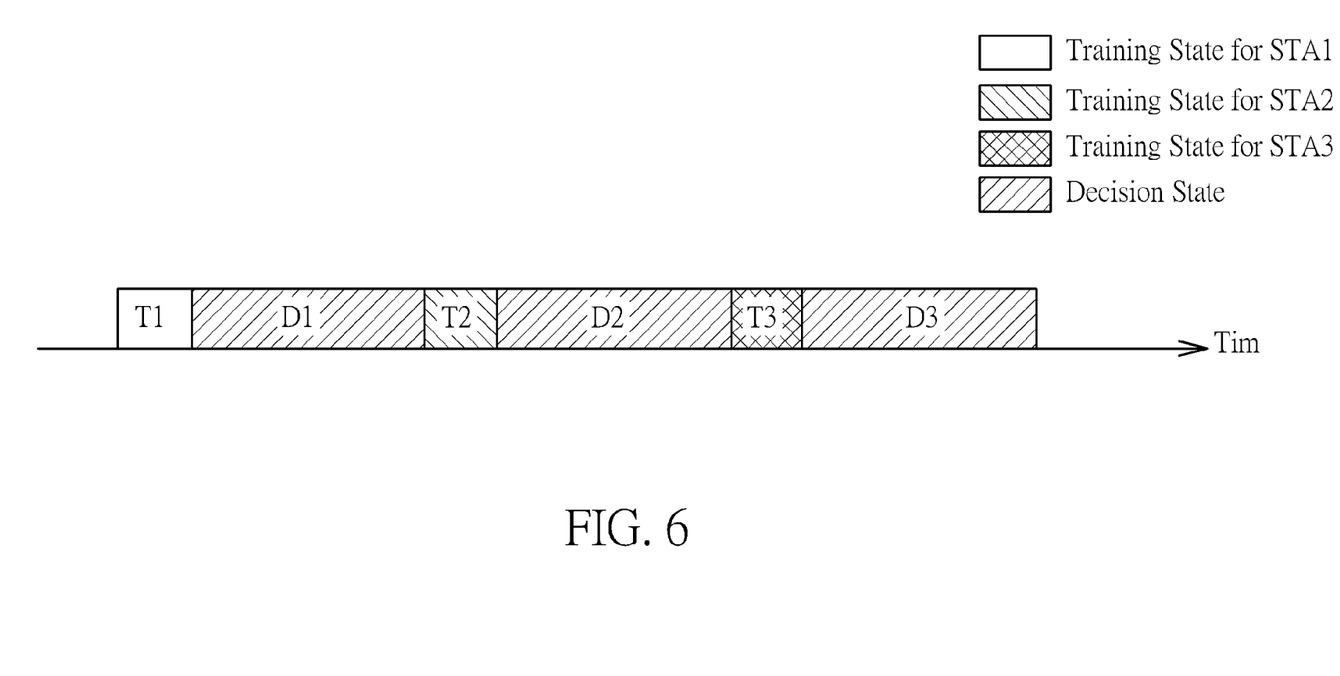
FIG. 6 is a timing diagram illustrating a scenario of connecting to multiple source addresses according to an embodiment of the present invention.

FIG. 6 is a timing diagram for illustrating a scenario of connecting to multiple source addresses according to an embodiment of the present invention. Please refer to FIG. 6 in conjunction with FIG. 4. In this embodiment, the wireless communication system 20 is connected to multiple devices STA1, STA2 and STA3 at the same time. During a training state T1, the back-end circuit 24 configures the training address to be the MAC address of the device STA1 for packet reception and transmission. After the training state T1, a first best antenna combination with the strongest signal intensity corresponding to the device STA1 should be found, and the system enters into a decision state D1. In the same way, during a training state T2, the back-end circuit 24 configures the training address to be the MAC address of the device STA2 for packet reception and transmission. After the training state T2, a second best antenna combination with the strongest signal intensity corresponding to the device STA2 should be found. During a training state T3, the back-end circuit 24 configures the training address to be the MAC address of the device STA3 for packet reception and transmission. After the training state T3, a third best antenna combination with the strongest signal intensity corresponding to the device STA3 should be found. Accordingly, a mapping table between the best antenna combinations and the destination addresses is established, and the back-end circuit 24 will inform the transmission module 28 of the best antenna combination according to destination address. For example, if a packet is to be transmitted to STA1, the back-end circuit 24 will attach the best antenna combination corresponding to STA1 to the packet.

Figure 7:
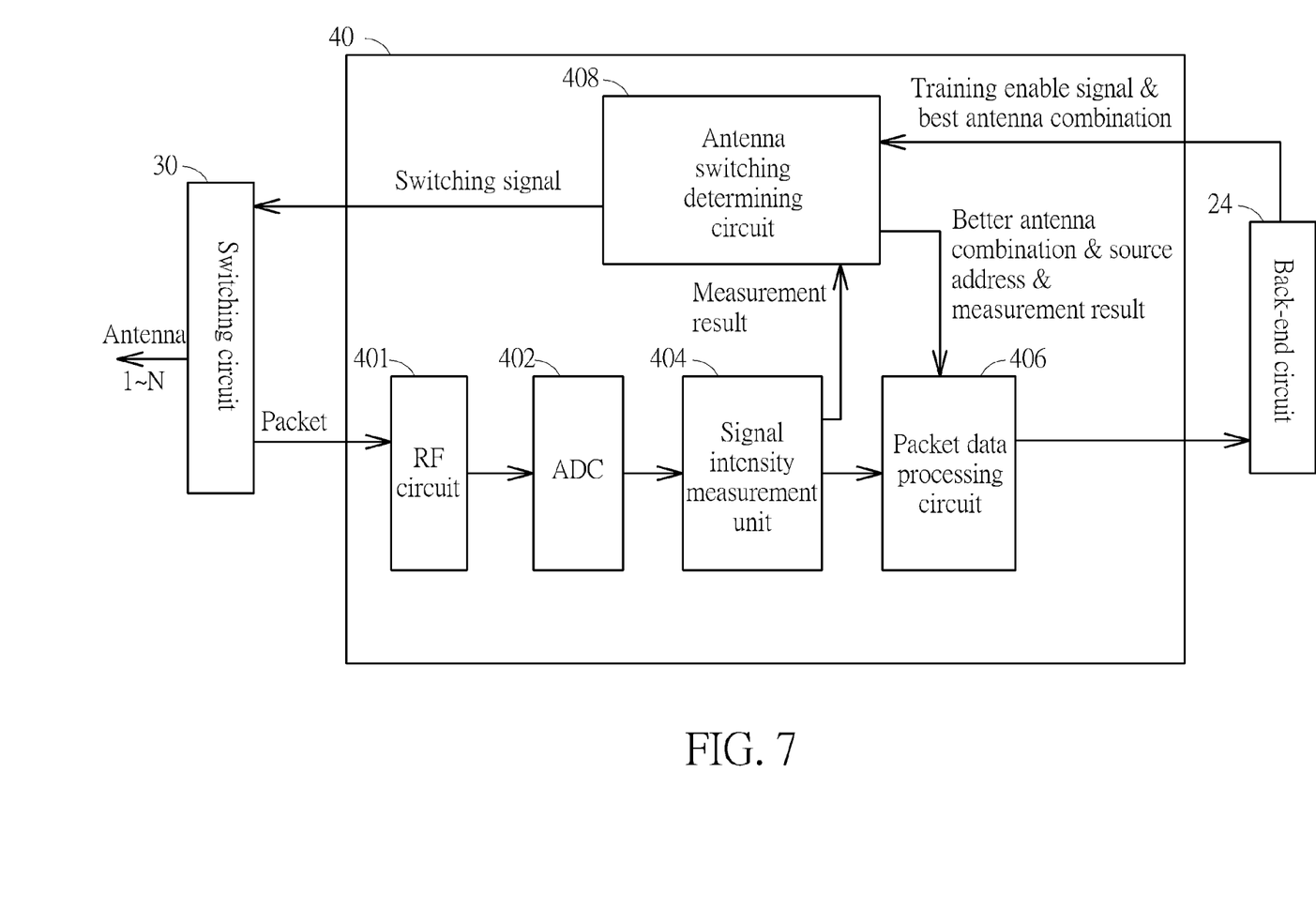
FIG. 7 is a diagram illustrating a receiving module according to an embodiment of the present invention.

FIG. 7 is a diagram illustrating a receiving module according to an embodiment of the present invention. A training enable signal provided by the back-end circuit 24 is used to control the antenna switching determining circuit 408 to perform corresponding operations during the training state. The antenna switching determining circuit 408 is used to generate antenna combinations and to provide corresponding switching signals to the switching circuit 30, so as to determine the antenna pattern for packet transmission and reception. During the training state, the antenna switching determining circuit 408 firstly provides a switching signal of the standby mode to control the switching circuit 30 to employ a configuration of the standby mode antenna combination for waiting for incoming packets. When a packet arrives, the receiving module 40 receives the header of the packet by using the standby mode antenna combination. The received packet is down-converted by a radio-frequency (RF) circuit 401, and then converted into a digital signal by an analog-to-digital converter (ADC) 402. A single intensity measurement unit 404 is used to measure the signal intensity of the currently received packet. The measurement result generated by the single intensity measurement unit 404 is provided to an antenna switching determining circuit 408. The antenna switching determining circuit 408 further changes a switching signal, and allows the switching circuit 30 to receive packets through another antenna combination, so as to derive the signal intensity of the another antenna combination and the corresponding measurement result. The antenna switching determining circuit 408 then selects a better antenna combination based on the signal intensity measurement results of the standby mode antenna combination and the another antenna combination, and provides the switching signal corresponding to the better antenna combination to the switching circuit 30 to complete the reception of the packet. Moreover, the antenna switching determining circuit 408 transmits information such as the better antenna combination, the source address of the packet and the corresponding measurement result (signal intensity) to the back-end circuit 24, so that the back-end circuit 24 can accordingly determine a best antenna combination. In this embodiment, the better antenna combination, the source address of the packet and the corresponding measurement result are appended to the packet, and then are transmitted to the back-end circuit 24 via a packet data processing circuit 406 at regular time intervals. When the back-end circuit 24 has determined the best antenna combination, the best antenna combination will be transferred to the antenna switching determining circuit 408 and the enable signal will be deasserted.

Figure 8:
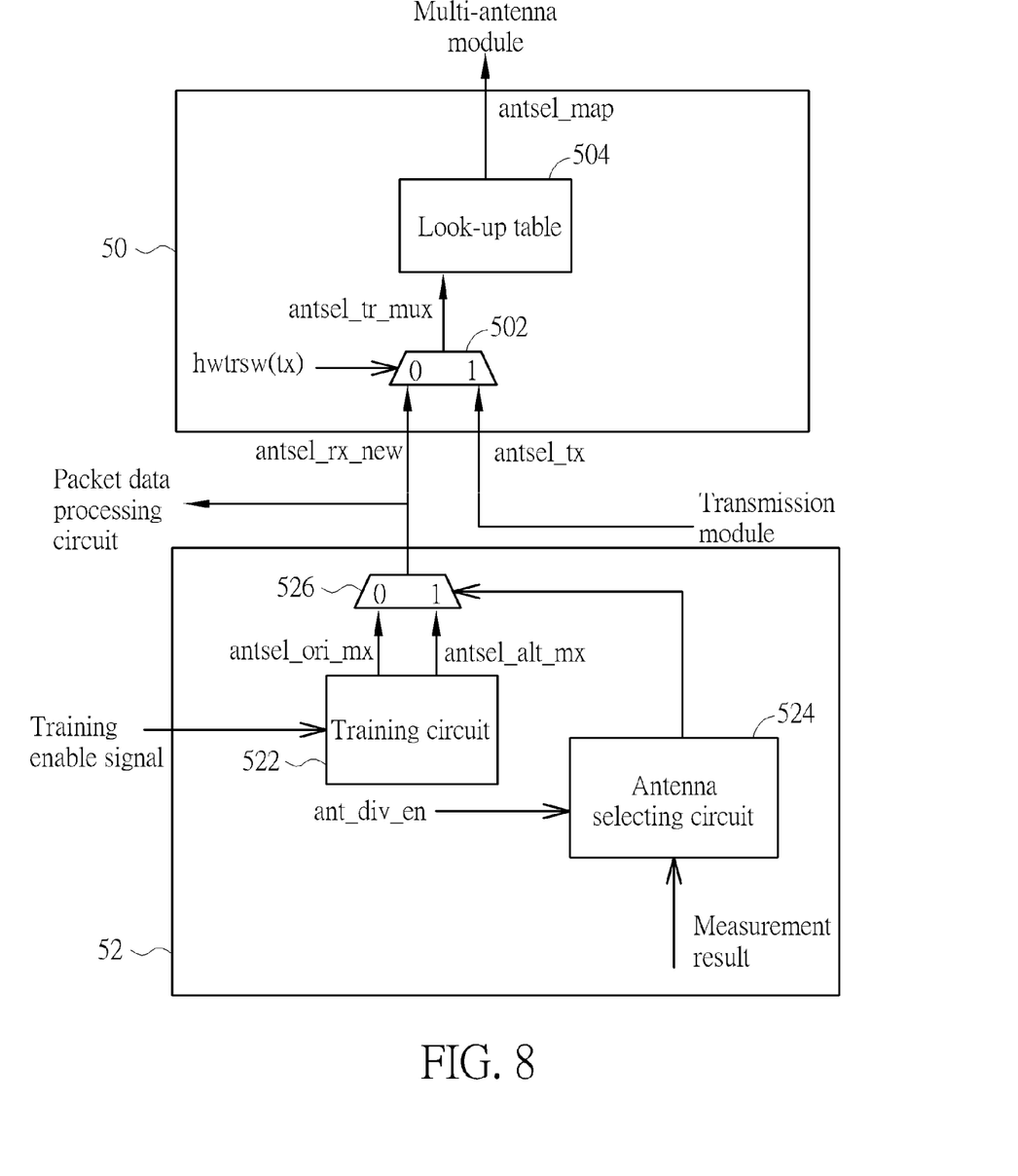
FIG. 8 is a diagram illustrating a switching circuit and an antenna switching determining circuit according to an embodiment of the present invention.

FIG. 8 is a diagram illustrating a switching circuit and an antenna switching determining circuit according to an embodiment of the present invention. The switching circuit 50 includes a lookup table 504 and a multiplexer 502. The antenna switching determining circuit 52 is disposed in a receiving module (not shown in FIG. 8), and includes an antenna selecting circuit 524, a training circuit 522 and a multiplexer 526. Circuits not related to the antenna switching determining function are not depicted in FIG. 8 for brevity. When receiving packets, the system controls the multiplexer 502 through a TX/RX control signal hwtrsw(tx) to conduct the signal transmitted from the receiving module. When the receiving module receives the training enable signal, the training circuit 522 will be activated and the system will enter into the training state; meanwhile, the antenna selecting circuit 524 will control the multiplexer 526 to conduct a signal antsel_ori_mx for indicating the antenna combination at the standby mode until a packet arrives. The signal antsel_ori_mx and a signal antsel_alt_mx correspond to different antenna combinations, respectively. When a packet is detected, the receiving module will firstly measure the signal intensity of the wireless packet received by using the antenna combination corresponding to the signal antsel_ori_mx, and then the measurement result will be provided to the antenna selecting circuit 524. The antenna selecting circuit 524 will further control the multiplexer 526 to switch to the signal antsel_alt_mx, and a measurement result of another antenna combination will be derived similarly. A better antenna combination will be obtained as a result of comparing the two measurement results with each other. The multiplexer 526 will then switched to the better antenna combination for packet reception. The better antenna combination will be also transmitted to the packet data processing circuit via a signal antsel_rx_new, and will be transmitted to the back-end circuit (not depicted in FIG. 8) later.

Figure 9:
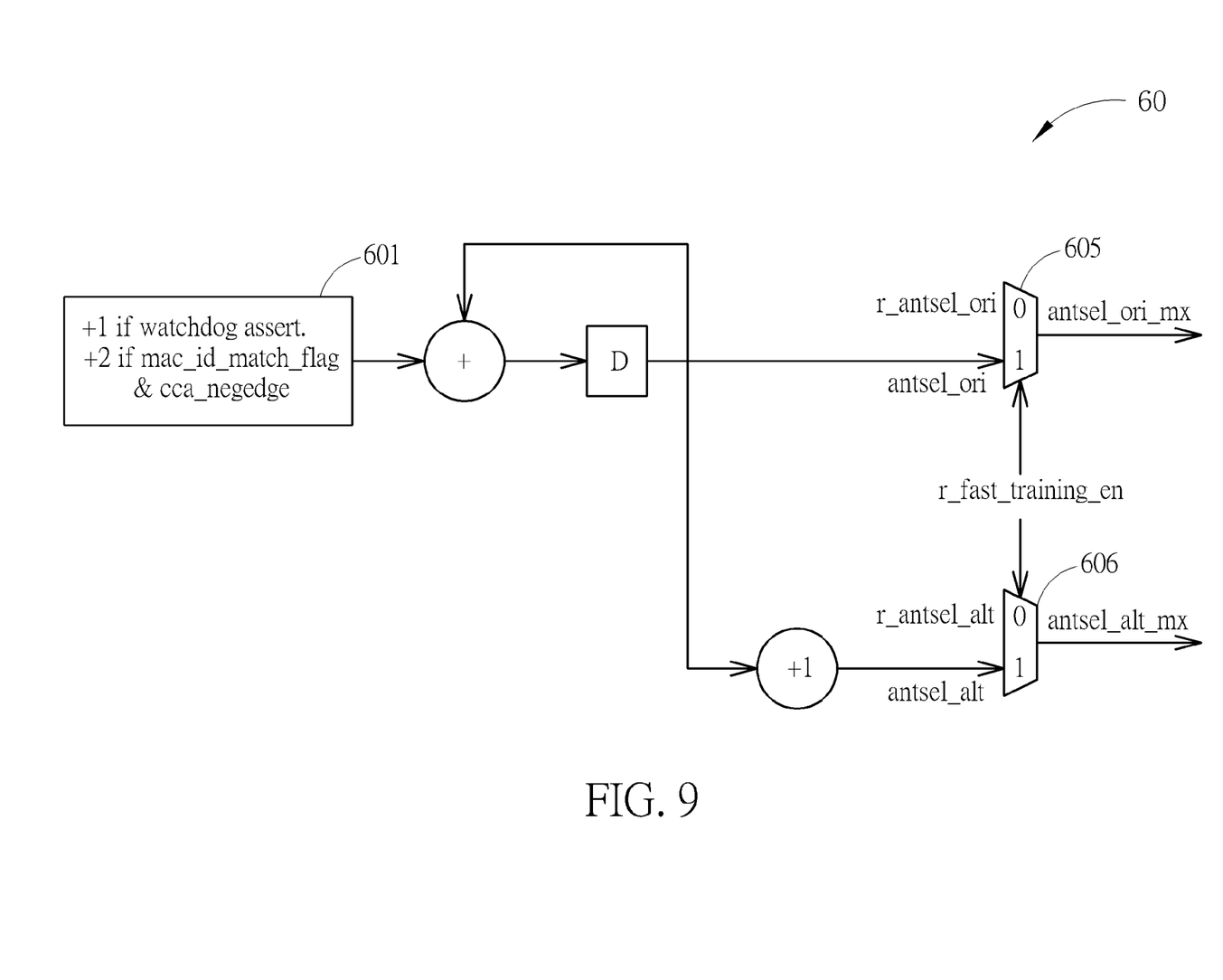
FIG. 9 is a diagram illustrating a training circuit according to an embodiment of the present invention.

The training circuit 522 is used to select a comparison group from existing antenna combinations, where each comparison group includes at least two antenna groups from which the antenna switching determining circuit 52 can select. In this embodiment, two antenna groups provided by the training circuit 522 are represented by the signal antsel_ori_mx and the signal antsel_alt_mx, respectively. FIG. 9 is a diagram illustrating a training circuit 522 according to an embodiment of the present invention. Please refer to FIG. 9 in conjunction with FIG. 8. Each of signals r_antsel_ori, r_antsel_alt, antsel_ori, and antsel_ alt has a range {0-Cmax}, where each value represents one of the antenna combinations. Cmax is the number of useable antenna combinations in respect of the training circuit. If there are N antennas, the maximum of Cmax can be $2^N-1$. When the system enters into the decision state, the training enable signal r_fast_training_en is deasserted (1'b0), the multiplexer 605 is switched to the signal r_antsel_ori, and the multiplexer 606 is switched to the signal r_antsel_alt; meanwhile, the antenna selecting circuit 524 merely makes its choice from the two antenna combinations corresponding to the signal r_antsel_ori and the signal r_antsel_alt respectively, and uses the signal r_antsel_ori as the antenna combination during the standby mode. In an embodiment, when the system enters into the decision state, the control signal ant_div_en can be utilized to cease functions of the antenna selecting circuit 524, and the antenna combination corresponding to the switching signal r_antsel_ori is set to be an omnidirectional antenna pattern. In this embodiment, the back-end circuit generates the best antenna combination each time the training state ends. If the best antenna combination is not an omnidirectional antenna combination, the back-end circuit will set the r_antsel_ori to the antenna combination corresponding to the omnidirectional antenna pattern, and will set the r_antsel_alt to the best antenna combination. Moreover, the control signal ant_div_en will be set to 1, and the antenna selecting circuit 524 will provide the signals r_antsel_ori and r_antsel_alt to the switching circuit 50. To put it another way, the antenna selecting circuit 524 will choose the one with better reception from the best antenna combination and the omnidirectional antenna combination. When the best antenna combination is substantially identical to the omnidirectional antenna combination, the back-end circuit will set the switching signal r_antsel_ori to the best antenna combination, and will set the control signal ant_div_en to 0; meanwhile, the switching signal generated from the receiving module will be fixed to be the signal r_antsel_ori. In one embodiment, the control signals r_antsel_ori and r_antsel_alt can be configured by control registers.

When the system enters into the training state, the training enable signal r_fast_training_en will be asserted (1'b1), the multiplexer 605 will be switched to antsel_ori, and the multiplexer 606 will be switched to antsel_alt, as shown in FIG. 9. Configurations of the antenna combination at this situation can be listed in pseudo codes as follows:

```
if (watchdog assert)
{antsel_ori = (antsel_ori+1) % Cmax;
    antsel_alt = (antsel_ori+1) % Cmax; }
else if (mac_id_match_flag & cca_negedge)
{antsel ori = (antsel ori+2) % Cmax;
    antsel_alt = (antsel_ori+1) % Cmax; }
```

A logic circuit 601 sets a waiting time interval at the training state, and counts down after a packet transmission/reception ends. If there is not any packet detected during the waiting time interval, then the signal watchdog assert will be asserted, the signal antsel_ori will be updated to antsel_ori+1, and the signal antsel_alt will become the updated antsel_ori+1. In other words, the training circuit provides the signals corresponding to the other two antenna combinations to be the updated comparison group. When the updated antsel_ori or the updated antsel_alt exceeds Cmax, the remainder derived by dividing the updated antsel_ori or the updated antsel_alt by Cmax will be used to update the updated antsel_ori or the updated antsel_alt, i.e. recursively corresponding to the antenna combinations. One of the objectives of the design is to avoid using a poor antenna combination during the standby mode, which may lead to packet detection failure. Hence, if there is no packet detected for a long time, another antenna combination will be used to replace the current one in order to avoid the aforementioned situation.

When a packet is detected and received successfully (cca_negedge=1), and the source address of the packet is identical to the training address (mac_id_match_flag=1), the value of antsel_ori will be updated to antsel_ori+2, and the antsel_alt will be updated to the updated antsel_ori+1. Once the packet from the training address is received, a second comparison group is selected and compared with the other two antenna comparisons different from the first antenna comparison group in respect of signal intensity. Furthermore, a third comparison group is selected when a next packet from the training address is received. In this way, all the antenna combinations can be scanned over quickly to obtain the one with the strongest signal intensity.

Figure 10:
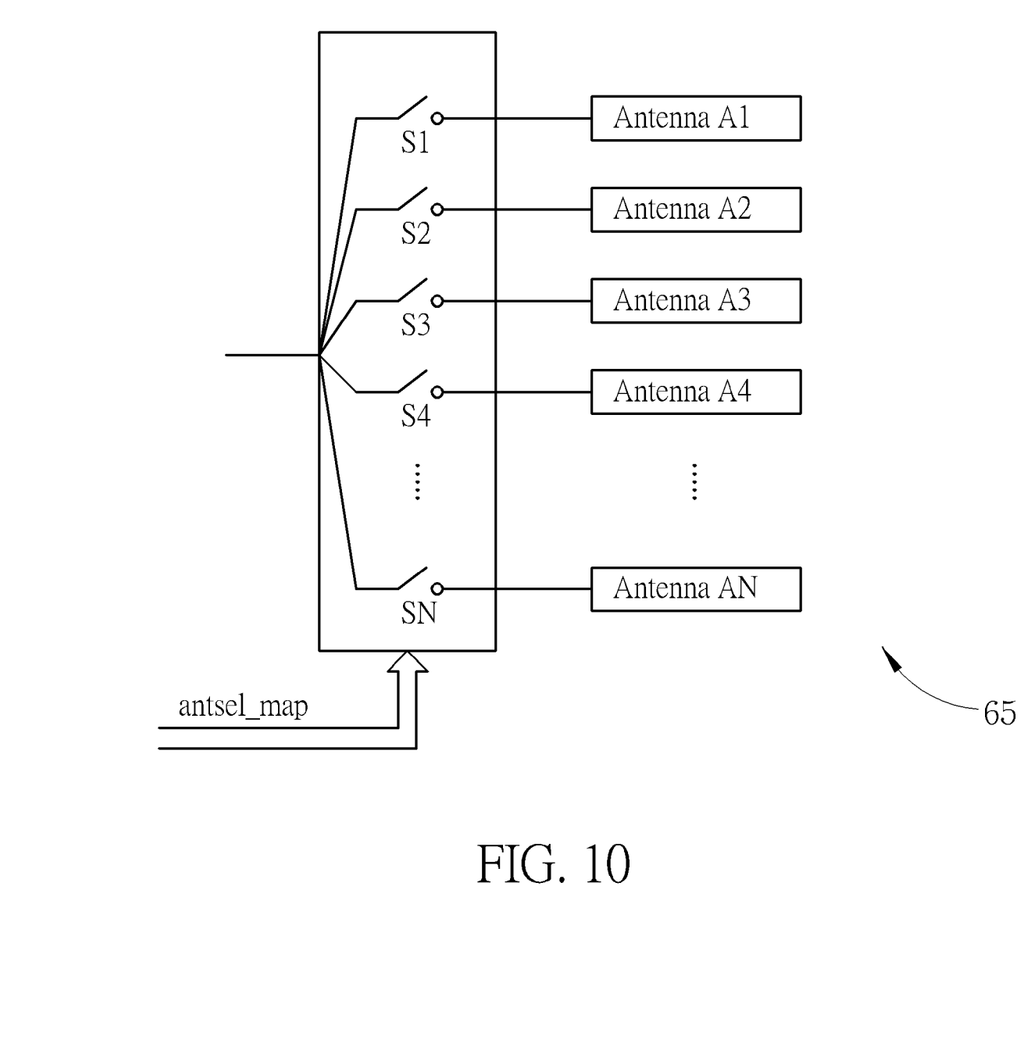
FIG. 10 is a diagram illustrating a multi-antenna module according to another embodiment of the present invention.

No matter where the switch signal is generated from the transmission module or the receiving module, a signal antsel_tr_mux is transmitted to the look-up table 504 and a corresponding antenna switching control signal antsel_map is obtained to control the multi-antenna module to become the corresponding antenna combination. FIG. 10 is a diagram illustrating the multi-antenna module controlled by the antenna switching control signal antsel_map according to an embodiment of the present invention. The antennas A1-AN are coupled to switches S1-SN, respectively. The antenna switching control signal antsel_map includes N bits, each corresponding to one of the switches S1-SN. The switch is disconnected when the corresponding bit is 1'b0, and is connected to the corresponding antenna when the corresponding bit is 1'b1. The range of the switching signal antsel_tr_mux can fully correspond to the rage of the antenna switching control signal antsel_map. For instance, when bit 1, bit 2 and bit N of the antenna switching control signal antsel_map are 1'b1 and the remaining bits are 1'b0, the corresponding antenna combination will be the antenna pattern composed of merely the antenna A1, antenna A2, and antenna AN conducted, i.e. packet are transmitted or received via the antenna A1, the antenna A2, and the antenna AN. The bit number of the switching signal antsel_tr_mux depends on the available number of the antenna combinations. Hence, the bit number should be greater than log 2 (Cmax) in order to represent all the available antenna combinations. Furthermore, the correspondence between the switching signal antsel_tr_mux and the antenna switching control signal antsel_map depends on the look-up table 504.

When the packet type is the response packet such as the Acknowledge (ACK) packet or the Clear To Send (CTS) packet, the MAC address brought by the packet will only comprise a Receiver Address (RA). In an embodiment, if a device determines that the Receiver Address of a received packet is identical to the local MAC address of itself, which means the received packet is a response packet of a packet transmitted by the device before. Under this situation, at the time the device transmits the better antenna combination and the related information to the back-end circuit, the device may further provide a destination address of its latest packet simultaneously. In this way, the back-end circuit may be able to derive the signal intensity of the packet from the destination address easily.

Please refer to FIG. 8 again. When packets are to be transmitted, the back-end circuit controls the multiplexer 502 by the TX/RX control signal hwtrsw(tx) to conduct the signal from the transmission module. The signal antsel_tx provided by the transmission module goes through the multiplext 502 to become the signal antsel_tr_mux, and then is converted to the corresponding antenna switching control signal antsel_map by the look-up table 504. Therefore, the multi-antenna module will be switched to the required antenna combination for packet transmission. The range of the signal antsel_tx from the transmission module is the same as that of the signal (antsel_ori_mx and antsel_alt_mx) from the receiving module, and each value in the range represents an antenna combination. The range of the signal antsel_tx can fully correspond to the range of the signal antsel_map, wherein the correspondence is the same as that between the switching signal antsel_tr_mux and the antenna switching control signal antsel_map.

In an embodiment, the value of the signal antsel_rx_new is preserved for a time interval of a short inter-frame spacing (SIFS). If the type of the packet to be transmitted is the response packet, the signal antsel_tx will be decided by the signal antsel_rx_new. Since the receiving module has determined a better antenna combination from the two currently available antenna combinations after receiving a packet from a source address, the better antenna combination therefore should be the better one between the currently two available antenna combinations when transmitting the response packet. Furthermore, rather than wait for the back-end circuit, the signal antsel_tx of the transmission module can be determined rapidly by controlling the receiving module to transmit the better antenna combination antsel_rx_new corresponding to the current packet to the transmission module.

When the transmission module completes the transmission of a packet, the response packet is sometimes expected to be received after the time interval SIFS. Hence, in an embodiment, the signal antsel_ori_mx of the training circuit 60 is configured as the value of the signal antsel_tx, and the configuration is remained for the time interval SIFS after the transmission module has transmitted a packet to an address. Once the response packet has detected, the corresponding antenna combination of the current signal antsel_ori_mx is used to receive the packet. It is also feasible to further employ an offset value OFFSET and set the duration to be SIFS+OFFSET, so as to compensate for the time lag between wireless apparatuses since the timers thereof are not quite the same. The present invention is featured in that when it is expected to receive a response packet, the transmission module will notify the receiving module the value of the signal antsel_tx of the packet which has just been transmitted to an address, so that the response packet from the address can have a chance to be received through the corresponding best antenna combination. This further improves the performance of packet reception.

In an embodiment, the back-end circuit notifies the transmission module the best antenna combinations corresponding to different source addresses after the system leaves the training state, and the transmission module stores these correspondences. When the receiving module has received a packet and asked the transmission module to transmit a response packet, the receiving module will transmit the source address of the current packet derived from the packet to the transmission module. The transmission module can find out the corresponding best antenna combination according to the source address of the current packet, and then configures the value of the signal antsel_tx to further control the switching circuit to transmit the response packet through the best antenna combination of the source address. In this way, the transmission module can determine the antenna combination by itself without waiting for back-end circuit's indication, and still can obtain the corresponding best antenna combination for the transmission of the response packet.

Please refer to FIG. 7. In practice, when the communication system is at the standby mode, the receiver gain (RX gain) of the receiving module 40 will be reset to an initial gain. The packet detection ability relates to the RX gain. For instance, the RX gain should be enlarged for receiving packets with low transmission power. During the training state at which two antenna combinations are used to measure the signal intensity respectively, the RX gain still remains at the initial gain. If the transmission power of the packet and the initial gain are both large, the performance of the analog-to-digital converter 44 may be degraded by signal clipping. As a result, the signal intensities obtained from the two antenna combinations are both at the same clipping level, and it is not possible to point out which antenna combination is better. In order to avoid the above issue, we can adjust the initial gain pursuant to the signal intensity after processed by the AGC, so as to take both the packet detection ability and the antenna combination determining mechanism into account. Ideally, concerns regarding the initial gain selection include keeping the farthest connection device connected and preventing the nearest connection device from signal clipping. The antenna combination under the standby mode during the training state constantly changes. In an embodiment, during the training state, the initial gain is selected according to the antenna combination with the strongest signal intensity among all the antenna combinations corresponding to the training address.

The wireless communication system, the control circuit and associated control method disclosed in the present invention can rapidly find out the antenna combination with better receiving ability for packet reception. In other words, a higher signal-to-noise ratio (SNR) can be obtained, so that it is easy to receive the data stream with a higher data rate which strictly requires a high SNR. In this way, the overall receiving ability of the communication system is improved. In addition, the channel effect is reciprocal in general cases. That is to say, antenna combinations with better receiving performance should possess better transmission performance as well. Hence, the proposed control method can be further applied to the transmitter to improve the transmission ability, such as the improved SNR of the packet transmission.

The transmission power of the wireless communication is restricted by countries or the system per se. When the distance between the transmitter and the receiver is extremely far, or the signal is attenuated by surrounding barriers (e.g. several concrete walls between the transmitter and the receiver), the reception performance of packets will be degraded. If the received packets are attenuated below a certain level, the receiver will fail to detect the packets. To put it another way, each antenna has its reception range. Packets transmitted from the area outside the reception range are unable to be successfully received. Hence, the predetermined antenna selection decides a reception range of the wireless communication system. The disclosed wireless communication system of the present invention records the signal intensity of all the transmitters which have the same Basic Service Set (BSS) with the receiver, and thus the target transmitter with minimum signal intensity can be found. The antenna with the strongest signal intensity in respect of the target transmitter is therefore selected to be the predetermined antenna for packet detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication apparatus for coupling to a multi-antenna module comprising a plurality of antennas, the wireless communication apparatus comprises:
   a switching circuit, arranged for selectively changing connected relations of the plurality of antennas according to a switching signal, so as to make the multi-antenna module to provide a plurality of antenna combinations; and
   a receiving module, coupled to the switching circuit, comprising:
      a signal intensity measurement circuit, arranged for measuring signal intensity of a wireless packet received through the plurality of antenna combinations, so as to generate a plurality of measurement results; and
      an antenna switching determination circuit, arranged for selecting a first comparison group comprising at least two antenna combinations from the plurality of antenna combinations during a training state, for receiving the wireless packet, and determining a better antenna combination according to measurement results of the first comparing group;
      wherein the receiving module records a source address of the wireless packet; the wireless communication apparatus determines a best antenna combination with respect to the source address of the wireless packet, and the receiving module enters the training state or a decision state according to a training enable signal, and the receiving module stores a training address, and during the training state, the antenna switching determination circuit selects a second comparison group when the source address of the wireless packet conform to the training address, so that the receiving module receives the wireless packet by using another two antenna combinations.

2. The wireless communication apparatus of claim 1, wherein the antenna switching determination circuit provides a first switching signal and a second switching signal according to the first comparison group, so as to make the receiving module to receive the wireless packet by using a first antenna combination and a second antenna combination.

3. The wireless communication apparatus of claim 2, wherein the signal intensity measurement circuit generates a first measurement result according to signal intensity of the wireless packet received by using the first antenna combination, and generates a second measurement result according to signal intensity of the wireless packet received by using the second antenna combination.

4. The wireless communication apparatus of claim 3, wherein the first measurement result and the second measurement result are generated during receiving a header of the wireless packet.

5. The wireless communication apparatus of claim 1, wherein the receiving module completes reception of the wireless packet by using the better antenna combination.

6. The wireless communication apparatus of claim 1, wherein the receiving module transmits the better antenna combination and related information thereof to a back-end circuit, so that the back-end circuit is able to determine the best antenna combination.

7. The wireless communication apparatus of claim 6, wherein the receiving module further comprises a packet data processing circuit arranged for appending the better antenna combination and the related information thereof to a data part of the wireless packet and transmitting to the back-end circuit.

8. The wireless communication apparatus of claim 6, wherein the related information comprises a measurement result corresponding to the better antenna combination and the source address of the wireless packet.

9. The wireless communication apparatus of claim 1, wherein the receiving module transmits the better antenna combination of the wireless packet and the related information to the back-end circuit only when the source address of the wireless packet conform to the training address.

10. The wireless communication apparatus of claim 6, wherein the back-end circuit determines the best antenna combination according to the wireless packet having the source address conforming to the training address and the related information thereof.

11. The wireless communication apparatus of claim 1, wherein the switching circuit comprises a look-up table arranged for converting the switching signal to a plurality of antenna switching control signals so as to control the connected relations of the plurality of antennas of the multi-antenna module.

12. The wireless communication apparatus of claim 1, further comprising a transmission circuit, coupled to the switching circuit.

13. The wireless communication apparatus of claim 12, wherein the switching circuit further comprises a multiplexer arranged for selectively conducting a signal provided by the receiving module or the transmission module to act as the switching signal according to a TX/RX control signal.

14. The wireless communication apparatus of claim 1, wherein the antenna switching determining circuit provides a switching signal corresponding to the best antenna combination at the decision state.

15. The wireless communication apparatus of claim 14, wherein the antenna switching determining circuit further provides an omnidirectional switching signal at the decision state so as to make the receiving module to use an omnidirectional antenna combination to wait for an incoming packet.

16. The wireless communication apparatus of claim 15, wherein the receiving module refers to receiving abilities of the best antenna combination and the omnidirectional antenna combination to select one of the best antenna combination and the omnidirectional antenna combination to receive packets at the decision state.

17. The wireless communication apparatus of claim 1, wherein the antenna switching determining circuit comprises:
a training circuit, enabled by the training enable signal, wherein the training circuit is arranged for providing a first switching signal and a second switching signal corresponding to the first comparison group at the training state;
a multiplexer, coupled between the training circuit and the switching circuit; and
an antenna selecting circuit, arranged for controlling the multiplexer to conduct the first switching signal or the second switching signal;
wherein at a standby mode of the training state, the antenna selecting circuit controls the multiplexer to conduct the first switching signal, so as to allow the receiving module to use a first antenna combination for receiving packets, and controls the multiplexer to conduct the second switching signal after a measurement result of the wireless packet is received by using the first antenna combination.

18. The wireless communication apparatus of claim 17, wherein the training circuit provides a third switching signal and a fourth switching signal corresponding to a second comparison group when the source address of the wireless packet complies with a training address, where the third switching signal corresponds to a third antenna combination and the fourth switching signal corresponds to a fourth antenna combination, and the third antenna combination and the fourth antenna combination have different antenna patterns.

19. The wireless communication apparatus of claim 1, wherein the antenna switching determining circuit selects a second comparison group when the antenna switching determining circuit does not detect any packet over a predetermined time interval.

20. The wireless communication apparatus of claim 1, wherein the training address comprises a first training address and a second training address which correspond to Media Access Control (MAC) addresses of a first apparatus and a second apparatus, respectively.

21. The wireless communication apparatus of claim 20, wherein the training state comprises a first training state and a second training state, the first training address is used to obtain the best antenna combination in respect with the first apparatus during the first training state, and the second training address is used to obtain the best antenna combination in respect with the second apparatus during the second training state.

22. The wireless communication apparatus of claim 12, wherein the receiving module provides the better antenna combination to the transmission module when the receiving module needs to transmit a response packet.

23. The wireless communication apparatus of claim 12, wherein in addition to providing the better antenna combination and the related information thereof to the back-end circuit, the receiving module further provides a destination address of its latest packet when a Receiver Address of the wireless packet complies with a Media Access Control (MAC) address of the wireless communication apparatus.

24. The wireless communication apparatus of claim 20, wherein the receiving module determines an initial gain according to one of the first apparatus and the second apparatus which has greater signal intensity.

25. A wireless communication control method for controlling a multi-antenna module with a plurality of antennas to perform wireless packet transmission and reception, the multi-antenna module being controlled to provide a plurality of antenna combinations, the control method comprising:
measuring signal intensity of a wireless packet received through the plurality of antenna combinations, so as to generate a plurality of measurement results;
entering a training state according to a training enable signal;
during the training state, selecting a first comparison group comprising at least two antenna combinations from the plurality of antenna combinations to receive a wireless packet, and determining a better antenna combination according to measurement results of the first comparing group, recording a source address of the wireless packet;
determining a best antenna combination with respect to the source address of the wireless packet;
entering a decision state according to the training enable signal;
storing a training address in advance; and
during the training state, selecting a second comparison group when the source address of the wireless packet complies with the training address, so that the wireless packet is received by using other two antenna combinations.

26. The wireless communication control method of claim 25, wherein the step of selecting the first comparison group from the plurality of antenna combinations to receive the wireless packet, and determining the better antenna combination according to the measurement results of the first comparing group comprises:
providing a first switching signal and a second switching signal according to the first comparison group, so as to allow the receiving module to receive the wireless packet by using a first antenna combination and a second antenna combination;
generating a first measurement result according to signal intensity of the wireless packet received by using the first antenna combination, and generating a second measurement result according to signal intensity of the wireless packet received by using the second antenna combination; and
comparing the first measurement result with the second measurement result, and selecting an antenna combination corresponds to a stronger signal intensity as the better antenna combination.

27. The wireless communication control method of claim 26, wherein the first measurement result and the second measurement result are generated during receiving a header of the wireless packet.

28. The wireless communication control method of claim 25, wherein the better antenna combination and related information thereof are further transmitted to a back-end circuit, so that the back-end circuit is able to determine the best antenna combination.

29. The wireless communication control method of claim 28, further comprising:
providing a switching signal corresponding to the best antenna combination at the decision state.

30. The wireless communication control method of claim 29, further comprising:
providing an omnidirectional switching signal at the decision state, so as to allow the receiving module to use an omnidirectional antenna combination for receiving packets.

31. The wireless communication control method of claim 30, further comprising:
referring to receiving abilities of the best antenna combination and the omnidirectional antenna combination to select one of the best antenna combination and the omnidirectional antenna combination to receive packets at the decision state.

32. The wireless communication control method of claim 25, further comprising:
selecting a second comparison group when the antenna switching determining circuit does not detect any packet over a predetermined time interval.

33. The wireless communication control method of claim 25, further comprising:
storing a first training address and a second training address in advance, wherein the first training address and the second training address correspond to Media Access Control (MAC) addresses of a first apparatus and a second apparatus, respectively.

34. The wireless communication control method of claim 33, wherein the training state comprises a first training state and a second training state, the first training address is used to obtain the best antenna combination in respect with the first apparatus during the first training state, and the second training address is used to obtain the best antenna combination in respect with the second apparatus during the second training state.

35. The wireless communication control method of claim 25, further comprising:
providing the better antenna combination to the transmission module when the receiving module needs to transmit a response packet.

36. The wireless communication control method of claim 33, further comprising:
determining an initial gain according to one of the first apparatus and the second apparatus which has greater signal intensity.

* * * * *